United States Patent [19]
Renner et al.

[11] 3,808,743
[45] May 7, 1974

[54] VEHICLE DOOR, ESPECIALLY FOR PASSENGER MOTOR VEHICLES

[75] Inventors: Hermann Renner, Magstadt; Bruno Sacco, Sindelfingen, both of Germany

[73] Assignee: Daimler-Benz Aktiengesellschaft, Stuttgart-Unterturkheim, Germany

[22] Filed: May 30, 1972

[21] Appl. No.: 257,963

Related U.S. Application Data
[63] Continuation of Ser. No. 810,504, March 26, 1969, abandoned.

[30] Foreign Application Priority Data
Apr. 30, 1969 Germany............................. 810504

[52] U.S. Cl...................... 49/502, 49/374, 296/153
[51] Int. Cl. ........ B60j 5/04, B60j 1/16, E05f 11/38
[58] Field of Search ............. 49/502, 374, 375, 376, 49/377, 378; 296/31, 31 P, 146, 153

[56] References Cited
UNITED STATES PATENTS

| | | | |
|---|---|---|---|
| 2,232,345 | 2/1941 | Schiff | 49/378 |
| 1,754,226 | 4/1930 | England | 49/502 |
| 2,438,185 | 3/1948 | Prance | 296/31 P X |
| 2,019,247 | 10/1935 | Blum | 296/153 |
| 2,807,498 | 9/1957 | Nelson | 49/502 |

FOREIGN PATENTS OR APPLICATIONS

| | | | |
|---|---|---|---|
| 1,025,408 | 4/1966 | Great Britain | 296/153 |
| 347,378 | 4/1931 | Great Britain | 49/502 |
| 782,485 | 9/1957 | Great Britain | 296/153 |

*Primary Examiner*—Mervin Stein
*Assistant Examiner*—Philip C. Kannan
*Attorney, Agent, or Firm*—Craig and Antonelli

[57] ABSTRACT

A vehicle door, especially for passenger motor vehicles in which reinforcing profiles are provided between the inner and outer sheet metal panels of the door while the lowerable window including its guide and actuating means are arranged within the space formed between the inner sheet metal panel of the door and a cover panel covering the inner sheet metal panel.

14 Claims, 2 Drawing Figures

PATENTED MAY 7 1974　　　　3,808,743
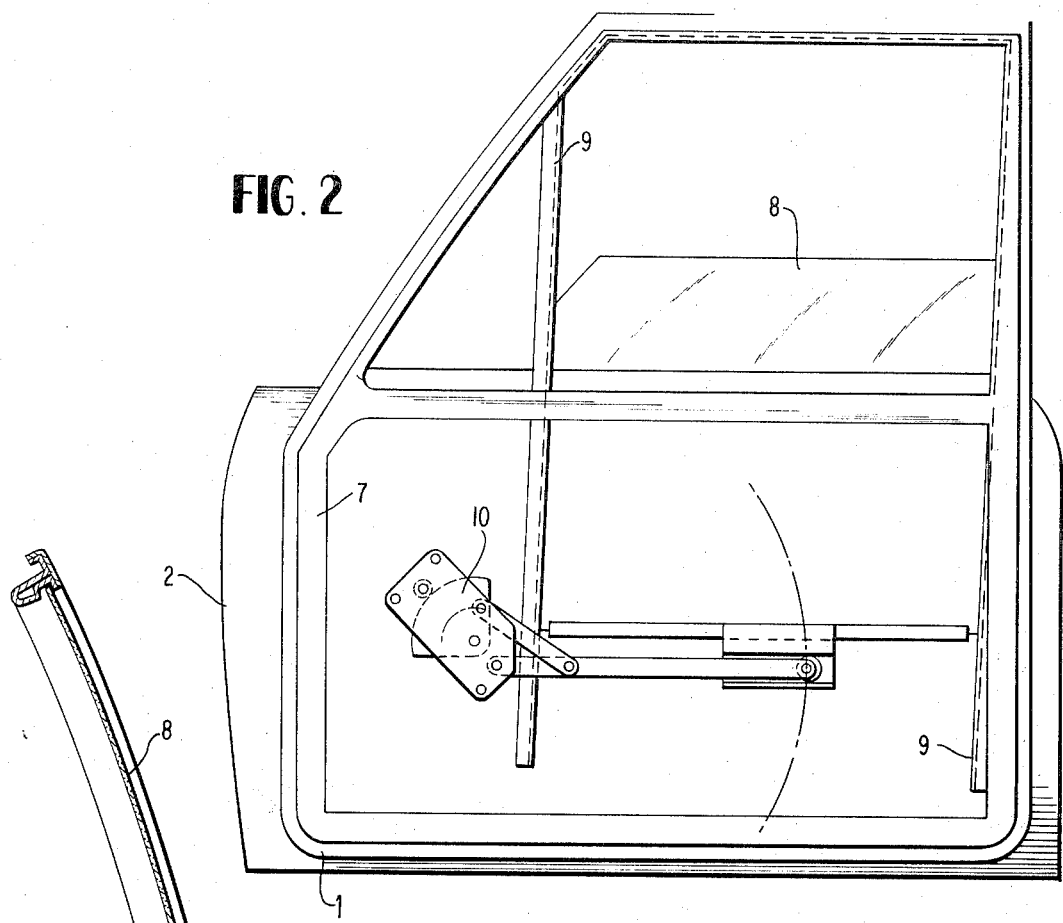
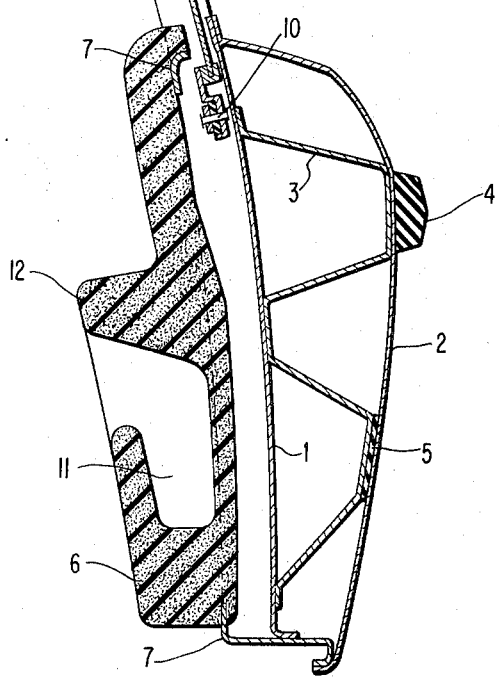
INVENTORS
HERMANN RENNER
BRUNO SACCO
BY Craig, Antonelli, Stewart & Hill
ATTORNEYS

VEHICLE DOOR, ESPECIALLY FOR PASSENGER MOTOR VEHICLES

This is a continuation, of application Ser. No. 810,504 filed Mar. 26, 1969, now abandoned.

The present invention relates to a vehicle door, especially for passenger motor vehicles, which essentially consists of a door inner sheet metal panel and of a door outer sheet metal panel and which is equipped with a lowerable window.

With the prior art double-walled doors of this type, the lowerable window is arranged between the door inner sheet metal panel and the door outer sheet metal panel. The prior art types of construction entail the disadvantage that by reason of the lowerable window, no sufficient reinforcements can be provided between the door inner sheet metal panel and the door outer sheet metal panel.

The present invention aims at increasing the safety of the vehicle passengers, especially in case of lateral collision accidents, by the reinforcement of the doors and at enabling a simple assembly and disassembly of the lowerable window as well as of the associated guide elements and actuating means. The present invention essentially consists in that between the door inner sheet metal panel and the door outer sheet metal panel, reinforcing profiles extending preferably over the entire length and width of the door are provided and the lowerable window inclusive its guide elements and actuating means is arranged between the door inner sheet metal panel and a plate-like facing panel covering the door inner sheet metal panel. It becomes possible thereby in an extraordinarily advantageous manner to provide simple, conventional reinforcing means between the door inner sheet metal panel and the door outer sheet metal panel which connect these two panels with each other.

A further increase in the safety of the vehicle passengers is realized if the inner cover or facing panel of the door consists of a form-rigid synthetic resinous material dissipating energy during deformation.

In a structurally extraordinarily advantageous manner, the fastening of the inner face or cover panel of the door can be realized along a flange arranged parallelly to the door inner wall with a spacing to the door inner sheet metal panel and preferably extending about the entire circumference. The lower edge of the door inner cover or facing panel may thereby be mounted on the flange by means of a slot whereas the upper edge abuts against the flange and is secured at the same by means of screws or the like. Advantageously, the flange may also be provided laterally with a step or the like for the longitudinal centering on the inner cover panel of the door.

According to a further development of the present invention, the inner door cover panel may be provided with a pocket-like recess. Additionally, the inner door cover panel may be provided with a projection serving as arm rest. Deformation paths increasing the safety of the vehicle passengers are produced by the pocket-like recess and/or the arm rest.

Accordingly, it is an object of the present invention to provide a vehicle door, especially for passenger motor vehicles, which avoids by simple means the aforementioned shortcomings and drawbacks encountered in the prior art.

Another object of the present invention resides in a vehicle door, especially for passenger motor vehicles in which adequate reinforcements can be provided between the inner and outer sheet metal panels of the door notwithstanding the presence of a lowerable window.

A further object of the present invention resides in a vehicle door which not only greatly increases the safety of the passengers against injuries in case of lateral collision accidents but also greatly facilitates the assembly and disassembly of the lowerable window together with its guide and actuating means.

These and further objects, features and advantages of the present invention will become more obvious from the following description when taken in connection with the accompanying drawing which shows, for purposes of illustration only, one embodiment in accordance with the present invention, and wherein:

FIG. 1 is a transverse cross-sectional view through a motor vehicle door in accordance with the present invention, and FIG. 2 is a side elevational view on the door of FIG. 1 with the inner door cover panel removed.

Referring now to the drawing wherein like reference numerals are used throughout the two views to designate like parts, the motor vehicle door illustrated in these two views, essentially consists of a door inner sheet metal panel 1 and of a door outer sheet metal panel 2, between which are arranged conventional reinforcing profiles 3 extending over the entire length and width thereof which connect with each other the door inner sheet metal panel 1 and the door outer sheet metal panel 2. The reinforcing profiles 3 are appropriately secured by spot welding at the door inner sheet metal panel 1 whereas at the outer sheet metal panel 2, in addition to being secured by spot welding, they are connected thereat, for example, also by means of bolts or screws together with a protective strip 4 or by bonding and/or by intermediate felt layers 5.

A door inner cover or facing panel 6 constructed as wall adjoins the door inner sheet metal panel 1 in the direction toward the inside; the inner cover or facing panel 6 consists of a plate-like synthetic resinous material part made from a form-rigid but energy dissipating synthetic resinous material of any known type.

The mounting and fastening of the inner cover panel 6 takes place along a flange 7 which is a part of the door frame that projects inwardly and is provided along its circumference with the flange disposed parallel to the door inner wall 1. The door inner cover wall 6 is mounted with its lower edge on this flange whereas its upper edge abuts against this flange 7. The upper edge of the door inner cover panel 6 can be connected by means of screws or the like with the flange 7. Along the lateral edges, the flange 7 is provided in a manner not illustrated in detail with a step-shaped offset along which the door inner cover panel 6 can be aligned in the longitudinal direction.

The illustrated motor vehicle door is equipped with a lowerable window 8 which inclusive its guide rail 9 as well as its window lifter 10 are arranged between the door inner cover panel 6 and the door inner sheet metal panel 1. The window lifter 10 and the forward guide rail 9 are appropriately screwed onto the door inner sheet metal panel 1.

In order to absorb the impact energy occurring during an accident, it is appropriate, in order to obtain large deformation paths, to construct the door inner cover panel 6 thick-walled. The thick-walled inner door cover or facing panel 6 is advantageously provided with pocket-like recess 11 which may serve, for example, as map pocket or the like. Additionally, the door inner cover panel 6 is provided with an inwardly directed extension 12 that serves as arm rest.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A vehicle door, especially for passenger motor vehicles, which includes inner and outer door sheet metal panel means forming a substantially closed hollow door body, and which is equipped with a lowerable window means, reinforcing profile means for providing a deformation path in the transverse direction of the vehicle being provided between the inner and outer door sheet metal panel means and extending substantially over the entire length and width of the hollow door body, the reinforcing profile means forming together with the inner and outer door sheet metal panel means a series of adjoining closed reinforcing hollow bodies within the hollow door body continuously extending in the longitudinal direction of the vehicle over the entire width of the hollow body, the reinforcing profile means including at least one continuous member extending in the longitudinal direction of the vehicle between the inner and outer door sheet metal panel means over the entire width of the hollow door body to form the continuously extending adjoined reinforcing hollow bodies, said window means including its guide means and actuating means being arranged within the space formed between the inner sheet metal panel means and a wall-like cover panel means covering the inner sheet metal panel means and consisting of a form-rigid synthetic resinous material dissipating energy during deformation thereof, wherein the cover panel means is secured on a flange means arranged substantially parallel to the inner wall and at a distance to the inner sheet metal panel means and the flange means extends over substantially the entire circumference of the cover panel means.

2. A vehicle door according to claim 1, wherein the lower edge of the cover panel means is provided with a slot, the cover panel means being mounted on the flange means by said slot, whereas the upper edge of the cover panel means abuts against the flange means and is secured thereat.

3. A vehicle door according to claim 2, wherein the upper edge of said cover panel means is secured at the flange means by screws.

4. A vehicle door according to claim 2, wherein the flange means is provided laterally with step means for the longitudinal centering of the door cover panel means.

5. A vehicle door according to claim 4, wherein the cover panel means is provided with a pocket-like recess.

6. A vehicle door according to claim 5, wherein the cover panel means is provided with a projection serving as arm rest.

7. A vehicle door according to claim 1, wherein the flange means is provided laterally with step means for the longitudinal centering of the door cover panel means.

8. A vehicle door according to claim 1, wherein the cover panel means is provided with a pocket-like recess.

9. A vehicle door according to claim 8, wherein the cover panel means is provided with a projection serving as arm rest.

10. A vehicle door according to claim 1, wherein the cover panel means is provided with a projection serving as arm rest.

11. A vehicle door according to claim 1, wherein at least three adjoined closed reinforcing hollow bodies are formed within the vehicle door.

12. A vehicle door especially for passenger motor vehicles, which includes inner and outer door sheet metal panel means forming a substantially closed hollow body, and which is equipped with a lowerable window means, reinforcing profile means for providing a deformation path in the transverse direction of the vehicle being provided between the inner and outer door sheet metal panel means and extending substantially over the entire length and width of the hollow body, the reinforcing profile means forming together with the inner and outer door sheet metal panel means a series of adjoining closed hollow bodies extending in the longitudinal direction of the vehicle, the reinforcing profile means being a continuous metal member extending in the longitudinal direction between the inner and outer door sheet metal panel means to form the adjoined closed hollow bodies, the bodies being separated from one another only by the thickness of the metal member, said window means including its guide means and actuating means being arranged within the space formed between the inner sheet metal panel means and a wall-like cover panel means covering the inner sheet metal panel means, the cover panel means being secured on a flange means arranged substantially parallel to the inner wall and at a distance to the inner sheet metal panel means.

13. A vehicle door according to claim 12, wherein the edge surfaces of the metal member extending in the longitudinal direction of the vehicle are connected to one of the inner and outer door sheet metal panel means, and the edge surfaces of the metal member extending in the vertical direction of the door are connected to the door frame.

14. A vehicle door especially for passenger motor vehicles, which includes inner and outer door sheet metal panel means forming a substantially closed hollow body, and which is equipped with a lowerable window means, reinforcing profile means for providing a deformation path in the transverse direction of the vehicle being provided between the inner and outer door sheet metal panel means and extending substantially over the entire length and width of the hollow body, the reinforcing profile means forming together with the inner and outer door sheet metal panel means a series of adjoining closed hollow bodies extending in the longitudinal direction of the vehicle, the reinforcing profile means being a continuous metal member having a waved profile extending in the vertical direction of the door, adjacent portions of the waved profile being alternately connected with the inner and outer door sheet metal panel means to form the adjoined hollow bodies, said window means including its guide means and actuating means being arranged within the space formed between the inner sheet metal panel means and a wall-like cover panel means covering the inner sheet metal panel means, the cover panel means being secured on a flange means arranged substantially parallel to the inner wall and at a distance to the inner sheet metal panel means.

* * * * *

UNITED STATES PATENT OFFICE
CERTIFICATE OF CORRECTION

Patent No. 3,808,743      Dated May 7, 1974

Inventor(s) Hermann Renner and Bruno Sacco

It is certified that error appears in the above-identified patent and that said Letters Patent are hereby corrected as shown below:

Title Page, left column, line 14, which now reads:

"Apr. 30, 1969 Germany..............310504"

should read as follows:

--March 26, 1968 Germany...........P 17 55 057.1--

Signed and sealed this 19th day of November 1974.

(SEAL)
Attest:

McCOY M. GIBSON JR.      C. MARSHALL DANN
Attesting Officer      Commissioner of Patents